United States Patent
Kim et al.

(10) Patent No.: US 7,359,732 B2
(45) Date of Patent: Apr. 15, 2008

(54) METHOD OF EXCHANGING DATA SECURELY BETWEEN A MOBILE TERMINAL AND A MEMORY CARD

(75) Inventors: Su-Mi Kim, Gumi-si (KR); Seong-Kyu Byeon, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/052,843

(22) Filed: Feb. 9, 2005

(65) Prior Publication Data

US 2005/0176467 A1  Aug. 11, 2005

(30) Foreign Application Priority Data

Feb. 9, 2004  (KR) ................ 10-2004-0008410

(51) Int. Cl.
*H04B 1/38* (2006.01)
(52) U.S. Cl. ............... 455/558; 455/558; 455/557; 455/407
(58) Field of Classification Search ............ 455/558, 455/557, 407, 403, 410; 235/380, 486, 442
See application file for complete search history.

(56) References Cited

U.S. PATENT DOCUMENTS

2002/0165008 A1*  11/2002  Sashihara et al. ......... 455/558

FOREIGN PATENT DOCUMENTS

| CN | 1396596 | 2/2003 |
| EP | 1280149 | 1/2003 |

* cited by examiner

*Primary Examiner*—Lester G. Kincaid
*Assistant Examiner*—Sayed T Zewari
(74) *Attorney, Agent, or Firm*—Roylance, Abrams, Berdo and Goodman, LLP

(57) ABSTRACT

In a method for storing data in a memory card mounted in a mobile terminal, determining if the memory card is mounted in the mobile terminal. If the memory card is mounted in the mobile terminal, sensing data selected by a user to be stored in the memory card. If the selected data is determined to be downloadable chargeable content, unique information of the mobile terminal is included and encrypted in the chargeable content, and stored in the memory card. However, if it is determined that the selected data is general data. Then, it is determined if the general data must be encrypted. If the general data must be encrypted, the unique information of the mobile terminal is included in the general data, and the general data including the unique information of the mobile terminal is stored in the memory card.

4 Claims, 4 Drawing Sheets

METHOD OF EXCHANGING DATA SECURELY BETWEEN A MOBILE TERMINAL AND A MEMORY CARD

PRIORITY

This application claims to the benefit under 35 U.S.C. § 119(a) of an application entitled "METHOD FOR STORING AND REPRODUCING DATA IN A MOBILE TERMINAL", filed in the Korean Intellectual Property Office on Feb. 9, 2004 and assigned Serial No. 2004-8410, the entire contents of which are incorporated herein by reference.

BACKGROUND OF THE INVENTION

1. Field of the Invention

The present invention relates generally to a mobile terminal. More particularly, the present invention relates to a method for storing and reproducing data in a mobile terminal that can store the data along with its unique information when storing the data in a memory card mounted in the mobile terminal and can reproduce within certain limits the data.

2. Description of the Related Art

Generally, mobile terminals perform a voice communication function and a text message exchange function. As networks providing information have rapidly developed, a multifunction wireless communication terminal is needed which can perform various functions as well as the voice communication function.

Accordingly, a wireless Internet module is mounted in mobile terminals such that the mobile terminal can access the wireless Internet to receive various information services through the wireless Internet anytime and anywhere. When downloading data through the wireless Internet, users must pay packet data fees, information service fees, and the like.

Modern mobile terminals support photo and video taking functions, as well as, multimedia services such as Music On Demand (MOD) and Video On Demand (VOD), and the like, thus allowing users thereof to access a variety of content over their wireless Internet connections.

When downloading multimedia content by means of the mobile terminals, users must pay packet data fees, information service fees, and the like.

To increase the memory capacity of a mobile terminal, it can additionally comprise a memory card.

In order for the memory capacity to be easily expanded, an external memory card, which is easily portable and removable, is used.

Because the conventional mobile terminal uses the external memory card inserted thereinto to store only data comprising pictures taken by a user, it does not use an essential advantage of the external memory card according to the extension of the memory capacity. However, when the external memory card is used to store chargeable content requiring information service fees, there is a problem in that content providers cannot charge information service fees for the chargeable content because the chargeable content stored in the external memory card can be unlawfully distributed.

Furthermore, when any mobile terminal can reproduce the data on any external memory card, regardless of the importance of the data stored on the external memory card, there is a problem because the privacy of the data cannot be protected.

SUMMARY OF THE INVENTION

Accordingly, the present invention has been designed to solve the above and other problems occurring in the prior art. Therefore, it is an object of the present invention to provide a method for storing and reproducing data of a memory card in a mobile terminal that stores the data that also includes information regarding the mobile terminal when storing the data on the memory card and reproduces the data when the encryption information of the stored data is the same as the information regarding the mobile terminal.

It is another object of the present invention to provide a method for storing and reproducing data in a mobile terminal by which data is exchanged between a memory card, storing user data such as a phone book, schedule, memorandum, and the like, and the mobile terminal with the memory card when they are synchronized with each other.

In accordance with an aspect of the present invention, the above and other objects can be accomplished by a method for storing data in a memory card mounted in a mobile terminal. The method comprises the steps of determining if the memory card is mounted in the mobile terminal, sensing data selected by a user to be stored in the memory card from among data stored in the mobile terminal, if the memory card is mounted in the mobile terminal; determining if the selected data is downloaded chargeable content, and including and encrypting unique information of the mobile terminal in the chargeable content to store a result of the encryption in the memory card if the selected data is chargeable content; and determining that the selected data is general data if the selected data is not chargeable data, determining if the general data must be encrypted, and including the unique information of the mobile terminal in the general data to store the general data comprising the unique information of the mobile terminal in the memory card if the general data must be encrypted.

In accordance with another aspect of the present invention, the above and other objects can be accomplished by a method for reproducing data of a memory card mounted in a mobile terminal. The method comprises determining if the memory card is mounted in the mobile terminal, and reading data of the memory card if the memory card is mounted in the mobile terminal; determining if the data read from the memory card is encrypted; if the read data is encrypted, determining if encryption information included in the read data is the same as the unique information of the mobile terminal, and reproducing the read data if the encryption information is the same as the unique information of the mobile terminal; and if the encryption information is different from the unique information of the mobile terminal, preventing the read data from being reproduced.

In accordance with yet another aspect of the present invention, the above and other objects can be accomplished by a method for storing data in a mobile terminal. The method comprises determining if a memory card is mounted in the mobile terminal; if the memory card is mounted in the mobile terminal, determining if data stored in the mobile terminal is transferred to the memory card; if the data stored in the mobile terminal is transferred to the memory card, storing the data and encryption information together according to an encryption selection of a user; and if the data stored in the mobile terminal is not transferred to the memory card, determining if data stored in the memory card is transferred to the mobile terminal, and storing the data in the mobile terminal according to the presence of encryption if the data stored in the memory card is transferred to the mobile terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EXEMPLARY EMBODIMENTS

Embodiments of the present invention will now be described in detail herein below with reference to the accompanying drawings.

In the following description, a detailed description of known functions and configurations incorporated herein will be omitted for the sake of conciseness.

In the following description, encryption information is unique information of a mobile terminal in which a memory card is mounted, that is, information regarding a Mobile Identification Number (MIN) or Electronic Serial Number (ESN) is included in data stored in a memory card. The unique information of the mobile terminal is preferably the MIN or ESN. Additionally, in the following description, memory card means either an internal memory card fixedly mounted in the mobile terminal or an external memory card capable of being easily removed from the mobile terminal. Of course, both an internal memory and an external memory card may be used in a single mobile terminal.

Figure 1:
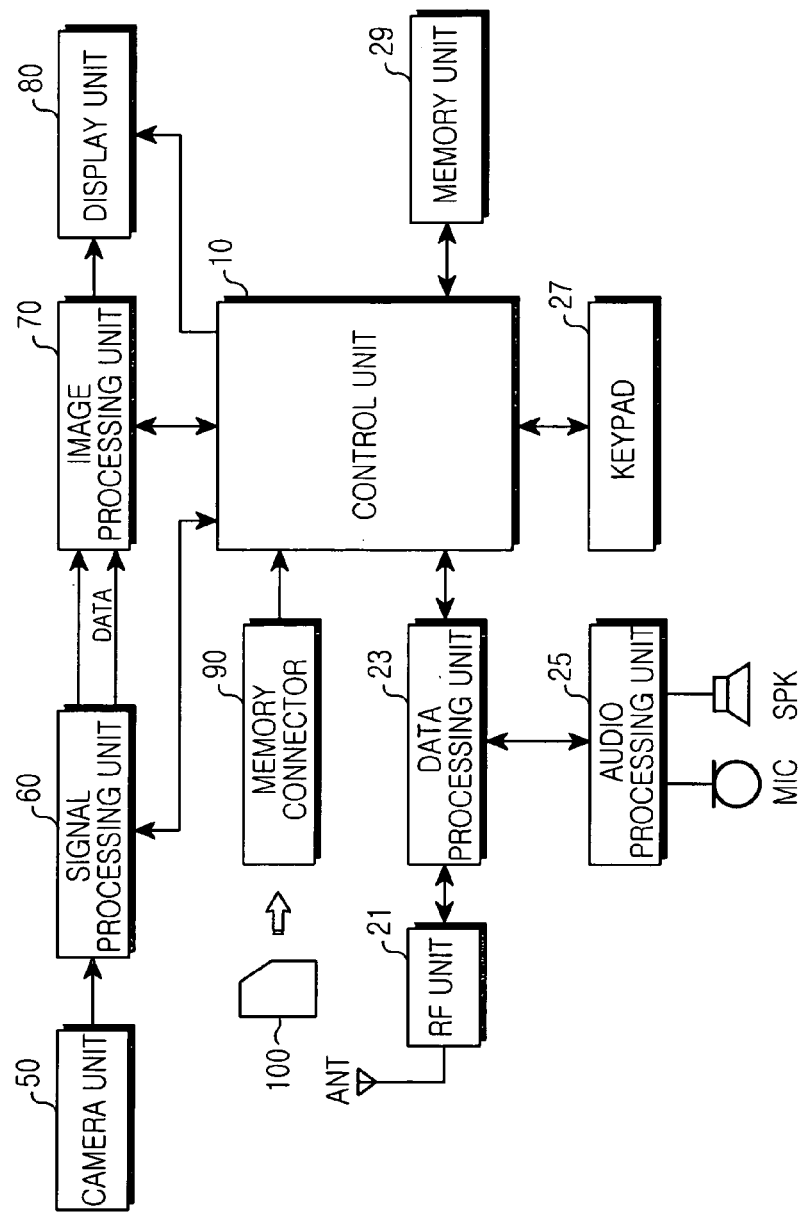
FIG. 1 is a block diagram illustrating a mobile terminal in accordance with an embodiment of the present invention.

FIG. 1 is a block diagram illustrating a mobile terminal in accordance with an embodiment of the present invention.

Referring to FIG. 1, a Radio Frequency (RF) unit 21 performs a communication function of the mobile terminal. The RF unit 21 comprises an RF transmitter for up converting and amplifying the frequency of a signal to be transmitted and an RF receiver for low-noise amplifying of a received signal and down converting a frequency of the received signal.

A data processing unit 23 comprises a transmitter for coding and modulating the signal to be transmitted and a receiver for demodulating and decoding the received signal. That is, the data processing unit 23 can be composed of a modulator-demodulator (MODEM) and a coder-decoder (CODEC).

An audio processing unit 25 performs a function for reproducing a received audio signal output from the data processing unit 23 or outputting a transmission audio signal generated from a microphone (MIC) to the data processing unit 23. Moreover, the audio processing unit 25 converts voice data from among data received from the data processing unit 23 into an audible sound, and then outputs the audible sound through a speaker (SPK). Further, the audio processing unit 25 converts an input voice signal into data, and then outputs the data to the data processing unit 23. In accordance with the embodiment of the present invention, the audio processing unit 25 outputs audio data of reproduced data through the speaker.

A keypad 27 comprises keys necessary for inputting number and letter information and function keys necessary for setting various functions.

A memory unit 29 can be composed of program and data memories, and the like. The program memory can store programs for controlling general operation of the mobile terminal. More specifically, the memory unit 29 stores a program for controlling an operation for storing encryption information according to the data to be stored in an external memory card 100 and a program for controlling an operation for reproducing the stored data according to whether or not the encryption information is the same as the unique information of the mobile terminal in accordance with the embodiment of the present invention. The data memory performs a function for temporarily storing data generated while the programs are executed.

A memory connector 90 serves as a connector for a memory capacity expansion of the memory unit 29 and connects the mobile terminal to the removable external memory card 100, which serves to allow easy expansion of memory capacity. The mobile terminal in accordance with the embodiment of the present invention has a slot into which the external memory card 100 can be inserted, formed in one side of the mobile terminal.

A control unit 10 performs a function for controlling the overall operation of the mobile terminal. Alternatively, the control unit 110 can include the data processing unit 23. More specifically, the control unit 10 controls an operation for storing the encryption information when chargeable content is stored in the external memory card 100 in accordance with the embodiment of the present invention. When data selected by the user through the keypad 27 is stored in the external memory card 100, the control unit 10 controls an operation for storing the encryption information along with the selected data in the external memory card 100 in accordance with the embodiment of the present invention. The control unit 10 compares the encryption information of the data stored in the external memory card 100 mounted in the mobile terminal with the unique information of the mobile terminal, and controls overall operation of the mobile terminal according to a result of the comparison.

The camera unit 50 comprises a camera sensor for capturing an image and converting an optical signal of the captured image into an electrical signal. It is assumed that the camera sensor is a Charge Coupled Device (CCD) sensor, although other types of sensors may be used.

A signal processing unit 60 converts the signal output from the camera unit 50 into an image signal. Preferably, a Digital Signal Processor (DSP) can implement the signal processing unit 60.

An image processing unit 70 performs a function for generating image data to display the image signal output from the signal processing unit 60. The image processing unit 70 outputs the image signal received under control of the control unit 10 or the image captured by the camera unit 50 on the basis of a format of the display unit 80. Moreover, the image processing unit 70 compresses and decompresses the image data.

The display unit 80 displays messages generated while a program is executed under the control of the control unit 10. In camera mode, the display unit 80 displays the image data output from the image processing unit 70 and displays user data output from the control unit 10 on a screen. The display unit 80 displays user data of the external memory card 100 mounted in the memory connector 90 under control of the controller 10 in accordance with an embodiment of the present invention. The display unit 80 can be a Liquid Crystal Display (LCD). In the case of the LCD, the display unit 80 can include an LCD controller, a memory capable of storing image data, an LCD element, and the like. When the LCD is implemented using a touch-screen system, the keypad 27 and the LCD can serve as an input unit. The camera unit 50, the signal processing unit 60, and the image processing unit 70 are components that additionally comprise the mobile terminal.

Operation of the mobile terminal will be described with reference to FIG. 1. When a user sets a signal transmission mode after a dialing operation through the keypad 27, the control unit 10 senses the set signal transmission mode, controls the data processing unit 23 to process received dial information, and controls the RF unit 21 to convert the processed information into an RF signal and output the RF signal. Subsequently, when an opposite subscriber generates a response signal, the control unit 10 senses the response signal through the RF unit 21 and the data processing unit 23. The user performs a communication function by means of a voice communication path established through the audio processing unit 25. On the other hand, when a signal reception mode is performed, the control unit 10 senses the signal reception mode through the data processing unit 23 and controls the audio processing unit 25 to generate a ringtone. Subsequently, when the user makes a response, the control unit 10 senses the response. The user performs a communication function by means of a voice communication path established through the audio processing unit 25. Although an example of voice communication in the signal transmission and reception modes has been described above, a data communication function for communicating packet data and image data other than the voice communication can be performed. When an idle mode or character or text communication is entered and or performed, the control unit 10 controls the display unit 80 to display character or text data processed by the data processing unit 23.

The mobile terminal can perform an operation for taking a picture of a person or scene and displaying or transmitting the taken picture. The camera unit 50 can be mounted in the mobile terminal or can be connected to a predetermined external location of the mobile terminal. That is, the camera unit 50 can be an external or internal camera. The camera unit 50 can use a CCD sensor. An image captured by the camera unit 50 is converted into an electrical signal by an internal CCD sensor. The electrical signal is applied to the signal processing unit 60. The signal processing unit 60 converts the image signal into digital image data and then outputs the digital image data to the image processing unit 70.

A process for storing and reproducing data using the external memory card 100 through the mobile terminal will now be described.

First, when data is stored in the external memory card 100 according to a control operation of the mobile terminal, the control unit 10 determines if the external memory card 100 is mounted in the memory connector 90. If the external memory card 100 is mounted in the memory connector 90, the control unit 10 senses a connection state between the external memory card 100 and the memory connector 90, and selectively stores the data in the memory unit 29 and the external memory card 100 in response to a selection of the user. Preferably, the control unit 10 can selectively store the data in the memory unit 29 and the external memory card 100, but can perform a setup operation such that the data can be stored in the external memory card 100 after the external memory card 100 is mounted in the memory connector 90.

When the data stored in the memory unit 29 is stored in the external memory card 100 after an environment for storing data in the external memory card 100 is set, the control unit 10 determines if corresponding data is chargeable data or general data.

If corresponding data is chargeable data, the control unit 10 stores encryption information along with the data. However, if the corresponding data is general data, the control unit 10 includes encryption information in the data based on the user's selection.

When the data stored in the external memory card 100 is reproduced, the control unit 10 determines if the external memory card 100 is mounted in the memory connector 90. If the external memory card 100 is mounted in the memory connector 90, the control unit 10 determines if the data stored in the external memory card 100 is encrypted. The control unit 10 determines if encryption information of the data is the same as the unique information of the mobile terminal. If the encryption information is the same as the unique information of the mobile terminal, the control unit 10 controls the display unit 80 to display image data of the corresponding data, or controls the speaker (SPK) to output audio data of the corresponding data.

A method for storing data in the external memory card 100 mounted in the mobile terminal illustrated in FIG. 1 will now be described in more detail with reference to FIG. 2.

Figure 2:
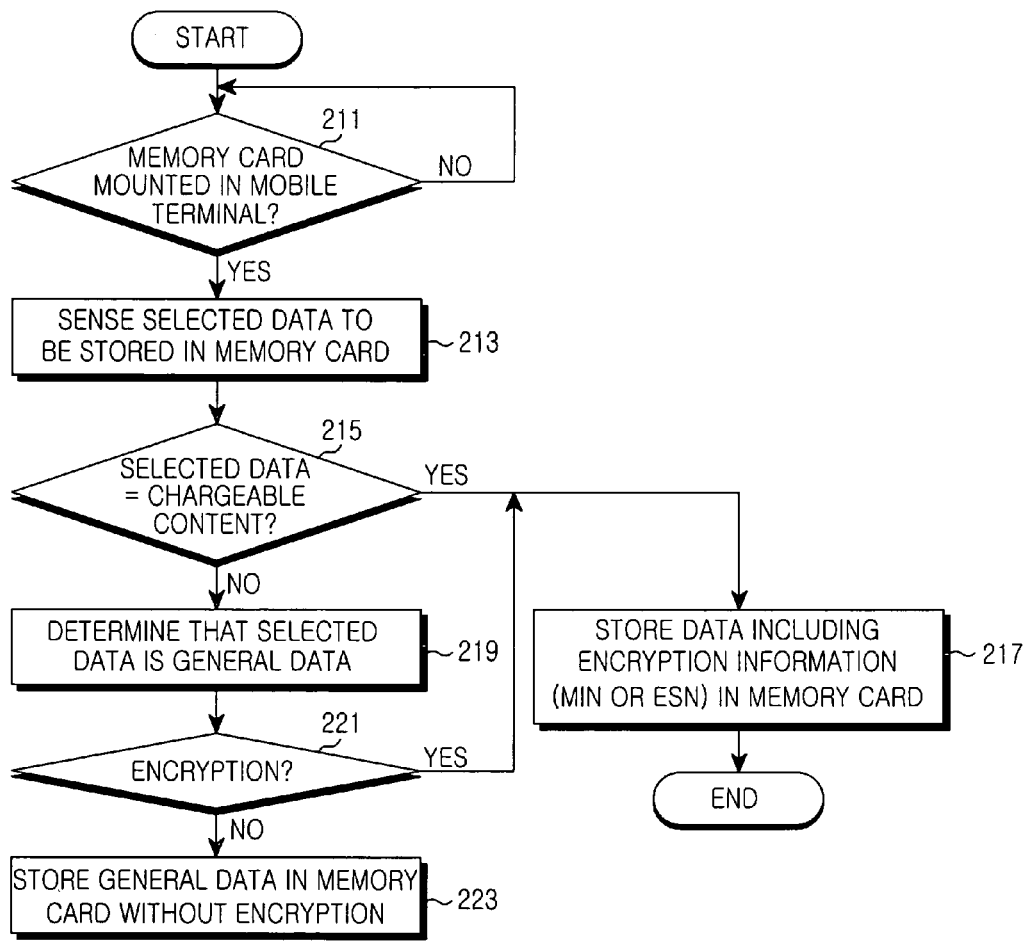
FIG. 2 is a flow chart illustrating a method for storing data of the mobile terminal in an external memory card in accordance with an embodiment of the present invention.

FIG. 2 is a flow chart illustrating a method for storing data of the mobile terminal in the external memory card 100 in accordance with an embodiment of the present invention. It is assumed in FIG. 2 that the memory connector 90 is connected to the external memory card 100.

Referring to FIG. 2, the control unit 10 determines if the external memory card 100 is mounted in the memory connector 90 in step 211. If the external memory card 100 is mounted in the memory connector 90, the control unit 10 senses selected data to be stored in the external memory card 100 in step 213.

In step 215, the control unit 10 determines if the selected data is chargeable content. If the selected data is chargeable data, the control unit 10 stores on the external memory card 100 corresponding chargeable content along with an MIN or ESN serving as encryption information of the mobile terminal. Here, the encryption information of the mobile terminal is unique information of the mobile terminal in which the external memory card 100 is mounted. The MIN or ESN serving as the encryption information is included and stored in a header of the chargeable content. Steps 215 to 217 correspond to a process for preventing the chargeable content from being unlawfully distributed.

However, if the data selected by the user is not chargeable content, in step 219, the control unit 10 determines that the selected data is general data such as a phone book, schedule, memorandum, or the like.

Subsequently, in step 221, the control unit 10 presents an inquiry to the user to determine if the user desires to encrypt the selected data determined as the general data. That is, the control unit 10 determines if the user has made a request for encryption through the keypad 27.

If the user has made a request for encryption of the general data, in step 217, the control unit 10 stores the selected general data along with encryption information in the external memory card 100. The control unit 10 preferably includes and stores the MIN or ESN serving as the encryption information in a header of the general data in the same way that the chargeable content is stored in the external memory card 100.

However, in step 223, if the user has not made an encryption request, the control unit 10 stores the general data in the external memory card 100 without encryption.

Data stored in the external memory card 100 through the above-mentioned process is reproduced by a method for reproducing data of the external memory card 100, which will be described in more detail below.

Figure 3:
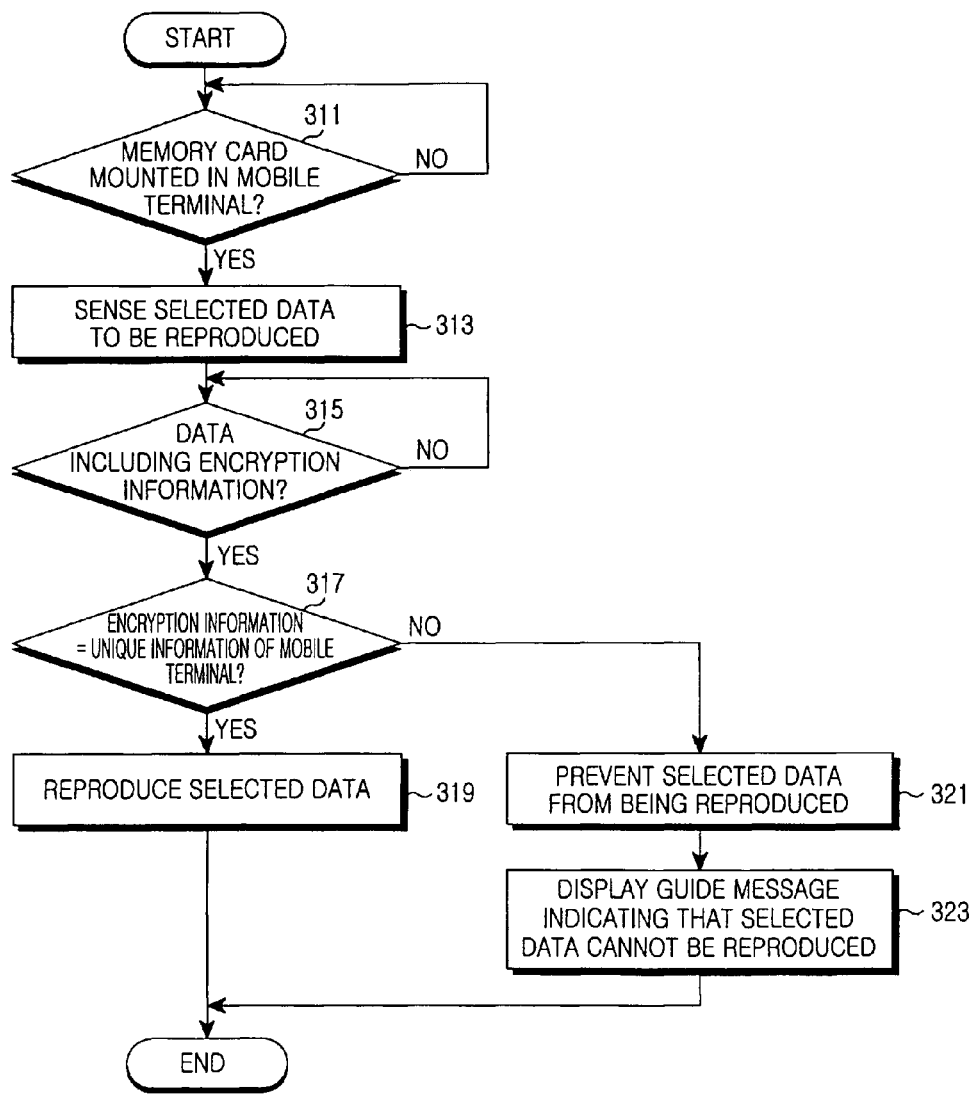
FIG. 3 is a flow chart illustrating a method for reproducing data of the external memory card through the mobile terminal in accordance with an embodiment of the present invention.

FIG. 3 is a flow chart illustrating a method for reproducing data of the external memory card 100 through the mobile terminal in accordance with an embodiment of the present invention.

Referring to FIG. 3, the control unit 10 determines if the external memory card 100 is mounted in the memory connector 90 in step 311. If the external memory card 100 is mounted in the memory connector 90, the control unit 10 senses selected data that the user desires to reproduce in step 313.

In step 315, the control unit 10 determines if the selected data includes encryption information. The determination is based on bit information indicating the presence of encryption included in a header field of corresponding data.

If the selected data includes encryption information, the control unit 10 determines whether the selected data is encrypted data, and determines if the encryption information is the same as unique information of the mobile terminal in step 317. Step 317 corresponds to a process for limiting data playback.

In step 319, the control unit 10 reproduces corresponding data if the encryption information of the selected data is the same as the unique information of the mobile terminal. Here, audio data of the selected data is reproduced through the speaker (SPK), and image data of the selected data is displayed on the display unit 80.

However, if the encryption information of the corresponding data is different from the unique information of the mobile terminal, the control unit 10 proceeds to step 321 and does not reproduce the corresponding data. Subsequently, the control unit 10 displays a guide text message on the display unit 80 or outputs a guide voice message (or alert sound) through the speaker (SPK) to provide a user notification that the playback function cannot be performed because the encryption information of the corresponding data is different from the unique information of the mobile terminal.

According to the method for storing data in the external memory card 100 of the mobile terminal and for reproducing data of the external memory card 100 through the mobile terminal, data is exchanged between the memory unit 29 of the mobile terminal and the memory card 100 mounted in the memory connector 90. This data exchange function is the same as a PC-link function for exchanging data between a mobile terminal and a computer.

A process for performing a data exchange operation between the memory 29 and the memory connector 90 will now be described in relation to a phone book, schedule and memorandum as examples.

Figure 4:
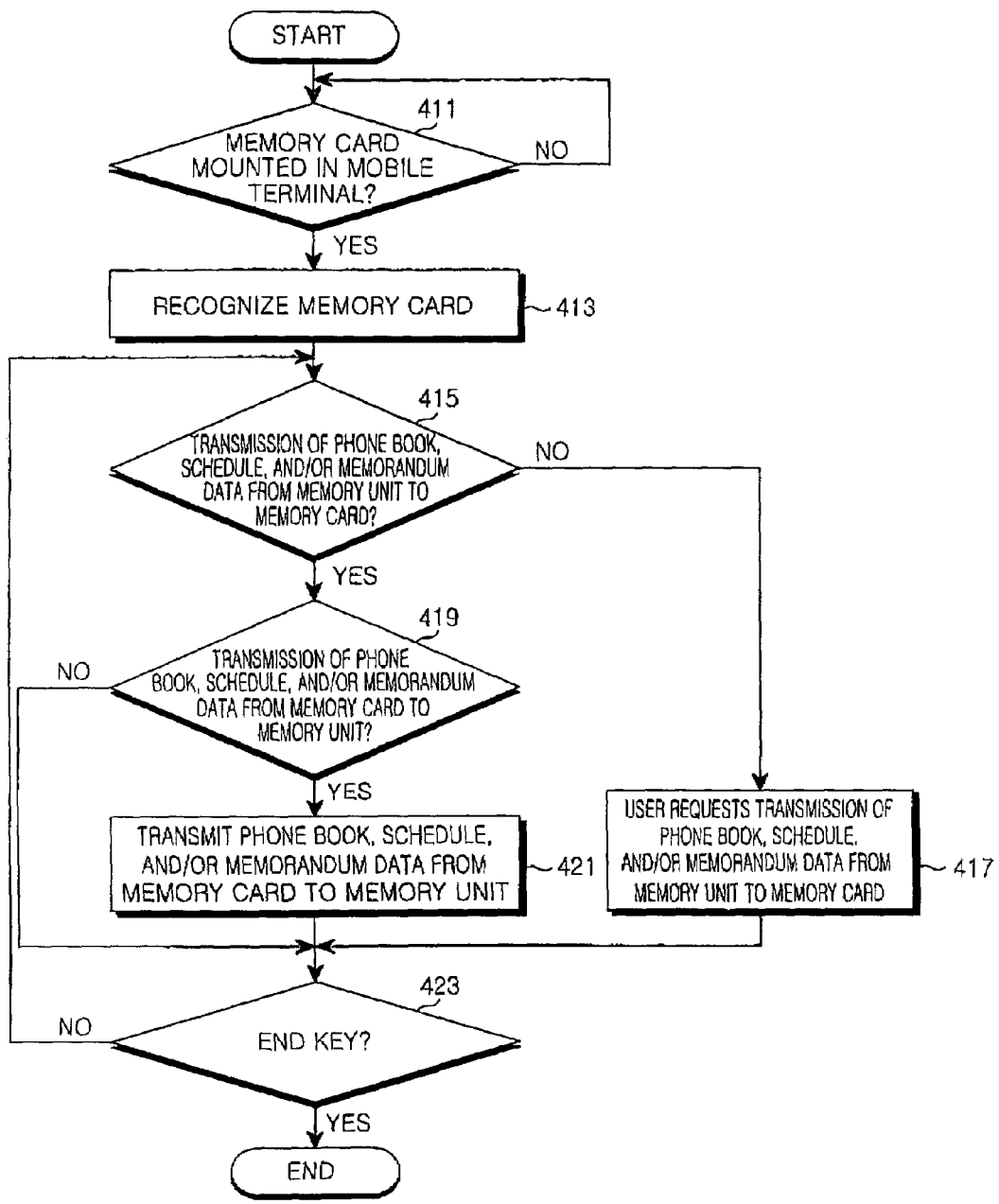
FIG. 4 is a flow chart illustrating a process for exchanging data between the mobile terminal and the memory card in accordance with an embodiment of the present invention.

FIG. 4 is a flow chart illustrating a process for exchanging data between the mobile terminal and the memory card in accordance with an embodiment of the present invention. Because a process for storing phone book, schedule and memorandum data including encryption information has been described in detail with reference to FIGS. 2 and 3, the above-described process will be omitted from the description relating to FIG. 4.

Referring to FIG. 4, the control unit 10 determines if the external memory card 100 is mounted in the memory connector 90 in step 411. If the external memory card 100 is mounted in the memory connector 90, the control unit 10 recognizes the external memory card 100 in step 413.

Subsequently, in steps 415 to 423, the control unit 10 transfers phone book, schedule and memorandum data stored in the memory unit 29 to the external memory card 100, or transfers phone book, schedule, and/or memorandum data stored in the external memory card 100 to the memory unit 29.

In step 415, the control unit 10 determines if the user manipulates the keypad 27 to transfer the phone book, schedule, and/or memorandum data stored in the memory unit 29 to the external memory card 100.

If the user manipulates the keypad 27 to transfer the phone book, schedule, and/or memorandum data stored in the memory unit 29 to the external memory card 100, the control unit 10 reads the phone book, schedule, and/or memorandum data of the memory unit 29 selected by the user, and transfers, to the external memory card 100, the data along with the encryption information according to an encryption request from the user in step 417. Then, corresponding data is stored in the external memory card 100 according to a control operation of the control unit 10.

However, if the phone book, schedule, and/or memorandum data stored in the memory unit 29 is not transferred to the external memory card 100, the control unit 10 determines if the user manipulates the keypad 27 to transfer the phone book, schedule, and/or memorandum data from the external memory card 100 to the memory unit 29 in step 419.

If the data stored in the external memory card 100 is transferred to the memory unit 29, the control unit 10 reads the phone book, schedule, and/or memorandum data of the external memory card 100 and transfers the read data to the memory unit 29 in step 421. Then, corresponding data is stored in the memory unit 29 according to a control operation of the control unit 10.

However, if the data stored in the external memory card 100 is not transferred to the memory unit 29, the control unit 10 determines if an END key provided in the keypad 27 has been input in step 423. If the END key has been input, the process is terminated.

However, if the END key has not been input, the process returns to step 415 and repeats the above process before the END key is input.

As apparent from the above description, embodiments of the present invention have a number of advantages. For example, embodiments of the present invention can store chargeable content in a memory card while preventing the chargeable content from being unlawfully distributed by encrypting unique information (MIN or ESN) of a mobile terminal and storing the encryption information and the chargeable content in the memory card for expanding memory capacity of the mobile terminal.

Moreover, the present invention can limit a playback operation of other mobile terminals to protect the privacy and ownership of corresponding data by encrypting unique information of a mobile terminal and including the encryption information in data to be stored in a memory card according to a user's selection.

Further, embodiments of the present invention can increase convenience for users while eliminating the inconvenience of connecting a mobile terminal and a Personal Computer (PC) through a communication cable by transferring data, such as a phone book, schedule, and memorandum data, or the like, to a memory card. This allows users to transfer data stored and used in a previous mobile terminal when the mobile terminal is replaced.

Because embodiments of the present invention can be implemented without a communication cable, it thereby eliminates the economic burden of purchasing the communication cable and increases the convenience for users.

Although the preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. A method of exchanging data securely between a mobile terminal and a memory card, the method comprising:
   determining whether the memory card is mounted in the mobile terminal, and sensing data selected by a user to be stored in the memory card from among data stored in the mobile terminal when the memory card is mounted in the mobile terminal;
   determining whether the selected data is downloaded chargeable content, and including and encrypting unique information regarding the mobile terminal in the chargeable content to store a result of the encryption in the memory card if the selected data is the chargeable content; and
   determining whether the data is to be encrypted when the selected data is general data, and including the unique information of the mobile terminal in the general data to store the general data including the unique information of the mobile terminal in the memory card when the general data is to be encrypted.

2. The method of claim 1, wherein the unique information of the mobile terminal is a Mobile Identification Number (MIN) or Electronic Serial Number (ESN).

3. A mobile terminal apparatus comprising:
   a memory card;
   a controller adapted to perform the steps of:
   determining whether the memory card is mounted in the mobile terminal, and sensing data selected by a user to be stored in the memory card from among data stored in the mobile terminal when the memory card is mounted in the mobile terminal;
   determining whether the selected data is downloaded chargeable content, and including and encrypting unique information regarding the mobile terminal in the chargeable content to store a result of the encryption in the memory card when the selected data is the chargeable content; and
   determining whether the data is to be encrypted when the selected data is general data, and including the unique information of the mobile terminal in the general data to store the general data including the unique information of the mobile terminal in the memory card if the general data is to be encrypted.

4. The apparatus of claim 3, wherein the unique information of the mobile terminal is a Mobile Identification Number (MIN) or Electronic Serial Number (ESN).

* * * * *